Jan. 28, 1936.  C. S. POPE  2,028,844
VALVE
Filed May 23, 1931  2 Sheets-Sheet 1
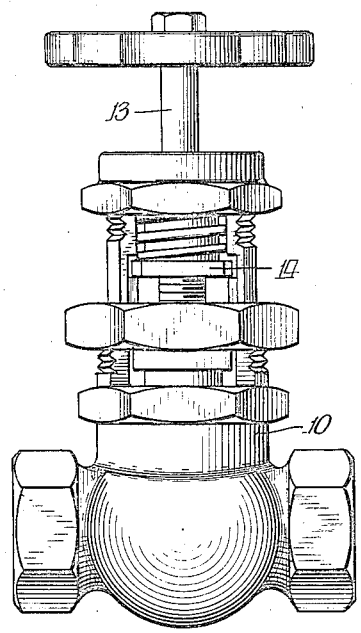
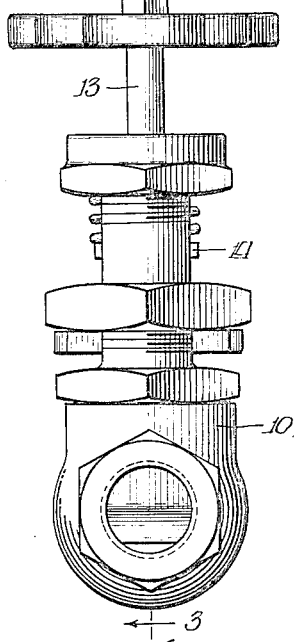
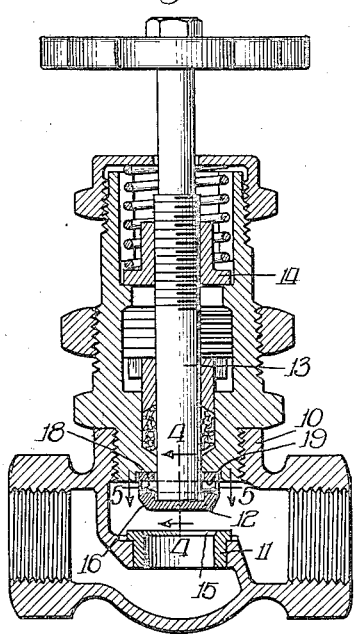
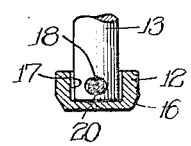
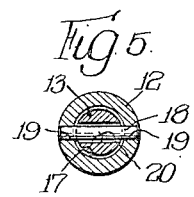
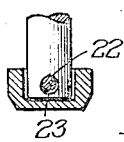
Inventor:
Charles S. Pope, Jan. 28, 1936. C. S. POPE 2,028,844
VALVE
Filed May 23, 1931 2 Sheets-Sheet 2
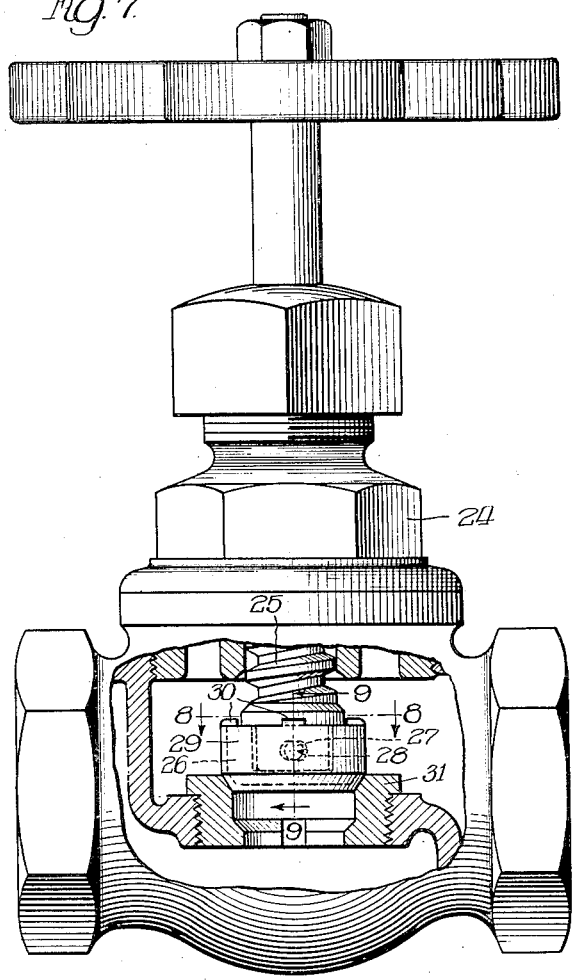
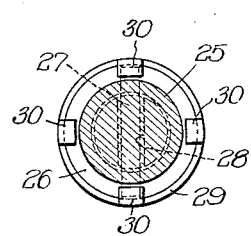
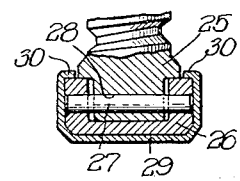
Inventor:
Charles S. Pope, Patented Jan. 28, 1936

2,028,844

UNITED STATES PATENT OFFICE 2,028,844

VALVE

Charles S. Pope, Chicago, Ill., assignor to Central Valve Mfg. Co., Chicago, Ill., a corporation of Delaware Application May 23, 1931, Serial No. 539,449

4 Claims. (Cl. 251—44)

This invention has to do with valves of the type in which the head is moved axially into engagement with the seat, and is particularly concerned with the manner in which the head is connected with the stem.

The principal object of the invention is to provide, in a valve of the type described, a novel and highly advantageous connection between the head and the stem, which connection insures a perfect alignment of the head with the seat, is simple in construction, and is quite inexpensive to manufacture.

The improvement which forms the subject matter of the present invention is of especially great value when incorporated in self-grinding valves, but it may be used with good results in other kinds of valves, including those provided with replaceable head plates.

While the foregoing statements are indicative in a general way of the nature of the invention, other objects and advantages will be apparent to those skilled in the art upon a full understanding of the construction, arrangement and operation of the improved head connection.

In the accompanying drawings:

Fig. 1 is a side view of a self-grinding valve equipped with the improvement of the invention;

Fig. 2 is an end view of the valve;

Fig. 3 is a vertical section through the valve, taken on the line 3—3 of Fig. 2;

Fig. 4 is a vertical section through the head of the valve, taken on the line 4—4 of Fig. 3;

Fig. 5 is a horizontal section, taken on the line 5—5 of Fig. 3;

Fig. 6 is a vertical section, corresponding to Fig. 4, showing a modification of the invention;

Fig. 7 is a partially sectioned side view of a globe valve equipped with the improvement of the invention;

Fig. 8 is a horizontal section, taken on the line 8—8 of Fig. 7; and

Fig. 9 is a vertical section, taken on the line 9—9 of Fig. 7.

The improved head connection is shown in Figs. 1 to 5 inclusive in a self-grinding valve 10, which valve is similar in construction, arrangement and operation to the one disclosed in Pope Patent No. 1,754,523, and therefore need not be described here in detail. Briefly, the valve 10 includes a seat 11, a head 12, a stem 13 and a resiliently yieldable block 14 for permitting the stem and head to turn to a certain extent after the latter has engaged with the seat. The turning movement referred to causes the head to be ground against the seat. The present invention resides in the hereinafter described connection between the head 12 and the stem 13.

The inner edge of the seat 11 is beveled at 15, and the outer edge of the head 12 is correspondingly beveled at 16 for fluid-tight engagement therewith. The head is provided, in its upper face, with a centrally located socket 17 in which the lower end of the stem 13 is positioned with the bottom of the stem in abutment with the bottom of the socket. The socket 17 is slightly larger in diameter than the contained portion of the stem, whereby to permit the head to shift laterally a little on the stem.

The head 12 is fastened to the stem by a pin 18 which extends transversely through aligned apertures 19 and 20 in the head and stem. The apertures 19, which are formed in the head at opposite sides of the latter, are of the same diameter as the pin, whereby to provide a tight fit for the pin, while the aperture 20, which is formed in the stem, is horizontally elongated in cross section, whereby to permit the pin, together with the head, to shift horizontally in any direction to the extent provided for by the difference in size between the stem and the socket.

The connection above described permits the head 12, upon reaching the seat 11, to center itself relative to the same, even though the stem 13 is not disposed in perfect alignment with the seat, which is frequently the case. If the stem is a little out of alignment with the seat, the head 12, upon engaging with the seat, will shift laterally on the lower end of the stem into concentric relation to the seat, due to the loose fit of the stem 13 in the socket 17 and the loose fit of the pin 18 in the aperture 20. By having the bottom of the stem abut against the bottom of the socket, the pin 18 is not required to transmit any thrust from the stem to the head. After the pin 18 has been positioned in the apertures 19 and 20, it may be upset slightly at its ends to prevent endwise movement. The head may be easily removed by merely driving out the pin. By making the aperture 20 fit the pin 18 snugly in a vertical direction, the head 12 is prevented from moving axially relative to the stem and from rocking or tilting on the stem 13 while remaining free to shift horizontally thereon, the engagement of the lower end of the stem with the bottom of the socket in the head cooperating with the pin to prevent rocking of the head.

In Fig. 6 is shown a slightly modified form of the invention which differs from the previously described form only in that the aperture 22 in the lower end of the stem, instead of being horizontally elongated in cross section, is circular in cross section but larger in size than the pin 23. This construction permits the head to shift laterally in any direction relative to the stem and also allows the head to rock somewhat on the stem.

In Figs. 7 to 9 inclusive, an ordinary globe valve 24 is shown. In this valve, the stem 25 is connected to the head 26 by a cross pin 27, and, as in the other forms of the invention, the aperture 28 in the stem, through which the pin extends, is horizontally enlarged to permit lateral movement of the pin therein. The head 26 is provided with a replaceable sheet metal plate 29 which fits about the sides and bottom of the head and is provided with a plurality of tongues 30 which are bent in over the top of the head in spaced relation to the sides of the stem. When the head plate 29 engages with the seat 31 of the valve, it will cause the head 26 to shift into concentric relation to the seat in case the stem 25 is not in axial alignment with the seat. The head 26 is prevented by the pin 27 from turning on the stem 25, but the plate 29 is preferably made so that it can turn with respect to the head. The head 26 may be used with or without the plate 29.

I claim:

1. In a self-grinding valve, a seat, a head for coaction with the seat, a stem on which the head is loosely mounted, means for turning and reciprocating the stem to bring the head in engagement with the seat, means for permitting the stem to continue to turn after the head has engaged with the seat, and a pin passing through transverse apertures in the head and stem for causing the head to turn with the stem in grinding engagement with the seat, said pin having lateral clearance in one of said apertures for permitting the head to center itself on the seat when turned in engagement therewith, and said pin serving in cooperation with coacting surfaces of the head and stem to prevent the head from tilting with respect to the stem.

2. In a valve, a seat, a head for coaction with the seat, a stem on which the head is mounted, the mounting permitting the head to shift laterally with respect to the stem into concentric relation with the seat when the head is moved into engagement with the seat, and comprising means for preventing the head from turning with respect to the stem, said last mentioned means also serving in cooperation with coacting surfaces of the head and stem to prevent the head from tilting with respect to the stem.

3. In a valve, a seat, a head for coaction with the seat, a stem on which the head is mounted, the mounting permitting the head to shift laterally in all directions in a plane perpendicular to the axis of the stem into concentric relation with the seat when the head is moved into engagement with the seat, and comprising means for both preventing the head from moving axially and from turning appreciably with respect to the stem.

4. In a valve, a stem, a head provided with a socket for the reception of the stem, and a pin extending through aligned apertures in the head and stem, one of said apertures fitting the pin tightly in a direction axially of the stem and fitting the pin loosely in a direction at right angles thereto.

CHARLES S. POPE.